E. S. BOYER.
PROCESS OF LINING METAL TANKS WITH HARD RUBBER.
APPLICATION FILED NOV. 18, 1920.
1,367,231.
Patented Feb. 1, 1921.
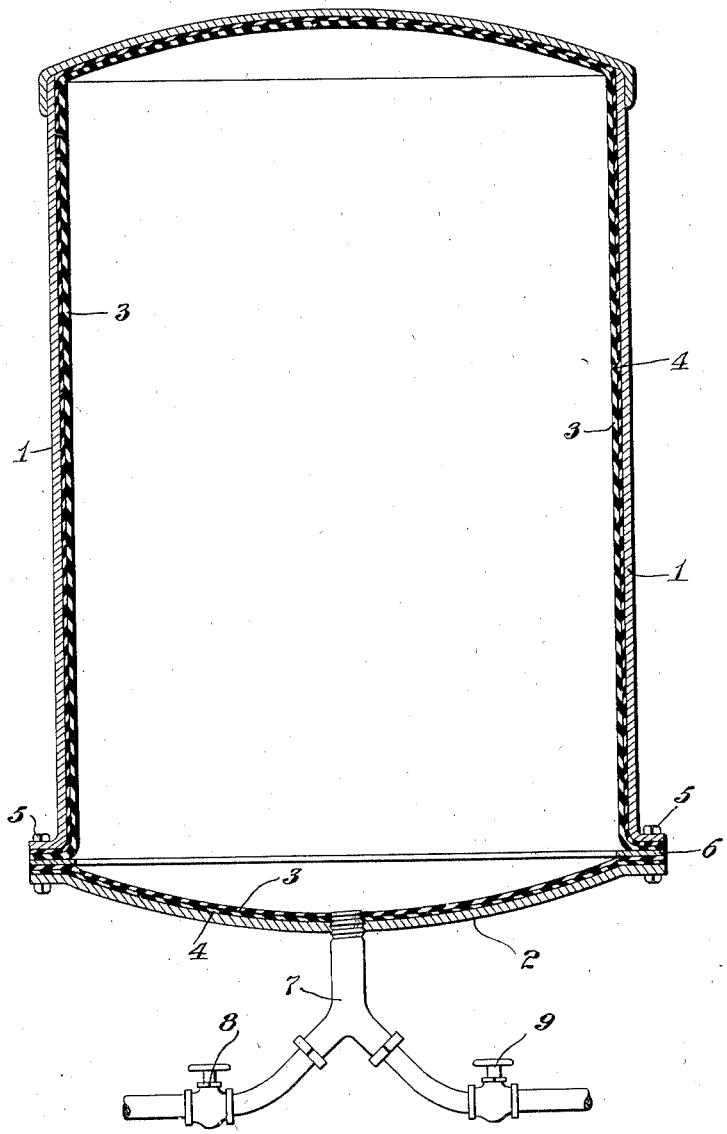
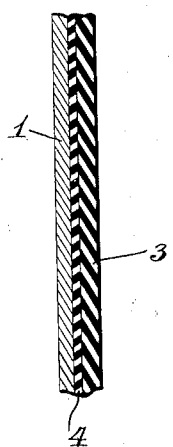
Attest:
Inventor:
Edwin S. Boyer
by
Atty

UNITED STATES PATENT OFFICE.

EDWIN S. BOYER, OF PLAINFIELD, NEW JERSEY, ASSIGNOR TO AMERICAN HARD RUBBER CO., OF NEW YORK, N. Y., A CORPORATION OF NEW YORK.

PROCESS OF LINING METAL TANKS WITH HARD RUBBER.

1,367,231.  Specification of Letters Patent.  Patented Feb. 1, 1921.

Application filed November 18, 1920. Serial No. 424,838.

*To all whom it may concern:*

Be it known that I, EDWIN S. BOYER, residing at Plainfield, county of Union, and State of New Jersey, have invented new and useful Improvements in Processes of Lining Metal Tanks with Hard Rubber, of which the following is a full, clear, and exact description, such as will enable others skilled in the art to which it appertains to use the same.

This invention relates to a process of lining the inner surfaces of metal tanks with a layer of hard rubber, and the objects of this invention are to provide a process that is particularly applicable for lining with a layer of hard rubber the inner surfaces of large steel tanks, that are several feet wide and several feet long, such as are used for storing and transporting large quantities of acids, alkalis or other metal corroding liquids.

To the accomplishment of the above objects and to such others as may hereinafter appear, the invention comprises a process of lining the inner surfaces of a tank with hard rubber which comprises covering the inner surfaces of the tank with a layer of soft rubber while the same is in a plastic condition, covering the layer of soft rubber while the same is in a plastic condition with a layer of hard rubber also in a plastic condition, applying steam under pressure to the interior of said tank to vulcanize said layers of hard rubber and soft rubber together said soft rubber being forced to adhere to the inner surfaces of the tank, and applying water under pressure after vulcanization has taken place to keep the rubber lining adhering to the tank while the lining and tank cool.

In accordance with the present invention the soft rubber compound is composed of suitable ingredients which when vulcanized will be soft and will retain some of the elastic qualities of the rubber, and will therefore more readily adhere to the inner surfaces of a metal tank, upon which a layer of the soft rubber compound is placed while still in its plastic or unvulcanized condition. As the soft rubber when vulcanized does not in itself afford a suitable lining for the inside of the tank, the same is in the present instance, and in accordance with the invention, covered while still in a plastic or unvulcanized condition with another layer of hard rubber, also in a plastic condition, which when vulcanized acts as a very efficient lining for the tank capable of resisting the actions of acids, alkalis or other metal corroding liquors held by said tank.

In accordance with the present invention when the inner surfaces of the tank are covered with super-imposed layers of soft and hard rubber, both in a plastic condition, as above described, the tank is closed and steam under pressure is admitted to the tank, the heat of the steam acts to vulcanize the super-imposed layers of soft and hard rubber, whereas the pressure of the steam acts to force the soft rubber into intimate contact with the inner surfaces of the tank with which it adheres with great tenacity, the pressure of the steam also acts to vulcanize the layers of soft and hard rubber together. After the steam under pressure has been admitted to the tank for a sufficient period of time to vulcanize the layers of soft and hard rubber, water is admitted under pressure to take the place of the steam under pressure. The water under pressure is preferably admitted to the tank while the steam under pressure is on, so as not to relieve the pressure acting to force the soft rubber into contact with the inner sides of the tank. When the water under pressure has replaced the steam, the steam is turned off and the water still under pressure is allowed to cool, the layers of soft and hard rubber now vulcanized together, the soft rubber being forced to adhere to the inner surfaces of the tank, as the tank also cools. When the rubber lining has cooled together with the tank the water is allowed to run out and the tank is ready for use.

Referring to the drawings:

Figure 1 is a longitudinal sectional view of a tank the inner surfaces of which are lined with hard rubber in accordance with the invention, showing steam and water connections for carrying out the invention.

Fig. 2 is a detail sectional view showing layers of soft and hard rubber in their plastic unvulcanized condition in position on a section of the tank.

In the drawings 1 designates a metal tank usually made of steel, the same in the present instance being closed at one end and provided with a removable cover 2 at the other end. The tank 1 in the present instance is cylindrical although the invention is equally applicable to square or irregularly shaped tanks. It is also to be noted that the tank 1 is in the present instance several feet wide and several feet long, the invention being particularly applicable to large tanks.

In accordance with the present invention the cover 2 is removed and the inside of the tank 1 thoroughly cleaned by washing the same with a suitable acid for example dilute sulfuric acid. After the inside of the tank has been thoroughly cleaned and the acid washed out, the inside of the tank is lined with a hard rubber compound 3, veneered with a soft rubber compound 4, both in a plastic or unvulcanized condition, the soft rubber compound being placed in contact with the inner surface of the tank 1 as shown in Fig. 2.

As the inside of the tank is not ordinarily an easy place to work the rubber compounds 3 and 4 are first stuck together and a thin layer of tin placed over the surface of the soft rubber 4, the same is then cut into suitable sections, to facilitate handling, the layer of tin being removed before the soft rubber 4 is placed in position against the tank.

In order to insure the soft rubber 4 sticking to the sides of the tank the same are preferably both suitably coated with one or more coats of suitable rubber cement before being placed in position in the tank; care should also be taken to carefully fit and cement the separate sections together so as not to leave exposed any of the soft rubber as it is important that there be no break in the continuity of the hard rubber inner surface.

In the present instance the hard rubber compound 3 is made in layers or sheets approximately one quarter of an inch thick, the same being veneered with a soft rubber compound 4 approximately one thirty second of an inch thick.

After the tank 1 has been lined as above described, the cover 2 is lined in the same manner and bolted into position on the tank by means of suitable bolts 5, a suitable metal washer 6 being used to separate the rubber lining of the cover from the overlapping rubber lining of the tank.

After the tank has been lined and closed the cover is preferably connected to a suitable connection 7 and steam under pressure is admitted to the tank by opening the valve 8, the heat of the steam acts to vulcanize the superimposed layers of soft and hard rubber, whereas the pressure of the steam acts to force the soft rubber into contact with the inner surfaces of the tank and cover, to which it adheres with great tenacity, the pressure of the steam also acts to vulcanize the layers of soft and hard rubber together. A steam pressure of approximately forty pounds, maintained for a period of approximately forty-five hours is ordinarily sufficient to vulcanize the rubber lining above described. The pressure of the steam and the time of vulcanization is more or less dependent upon the size of the tank and the thickness of the rubber lining.

After the steam under pressure has been admitted to the tank for a sufficient period of time to vulcanize the rubber lining, water is admitted under pressure while the steam is still on by opening the valve 9. The steam is then turned off by closing the valve 8 and the water under pressure is maintained until the rubber lining and the tank have cooled, the water under pressure acting to keep the rubber lining forced against the tank until the same has cooled when the water is allowed to run off, the tank being then ready for use.

From the above description it will be seen that the tank itself is used as a vulcanizer, the pressure of the steam and then the water acting to keep the rubber lining in contact with the inner surfaces of the tank until the same has set.

The use of the soft rubber to bind the hard ruber to the inner surfaces of the tank prevents the separation of the same due to temperature variations, vibrations and shocks. And the process above described insures that the rubber lining will remain in place and resist any action of the hard rubber to crack or break due to any outside agency striking or denting the tank.

While the invention has been described with particular reference to details the same is not to be considered as limited thereto as many changes can be made and still fall within the scope of the invention set forth in the following claims.

What I claim is:

1. The process of lining the inner surfaces of a tank with hard rubber which comprises covering the inner surfaces of the tank with a layer of soft rubber while the same is in a plastic condition, covering the layer of soft rubber while the same is in a plastic condition with a layer of hard rubber also in a plastic condition, applying steam under pressure to vulcanize said layers of hard rubber and said soft rubber together, said soft rubber being forced to adhere to the inner surfaces of the tank, and applying water under pressure after vulcanization has taken place to keep the rubber lining adhering to the tank while the rubber lining and tank cool.

2. The process of lining the inner surfaces of a tank with hard rubber which comprises covering the inner surfaces of the tank with superimposed layers of soft rubber and hard rubber while both are in a plastic condition, applying steam under pressure to vulcanize said superimposed layers of hard rubber and said soft rubber together, said soft rubber being forced to adhere to the inner surfaces of the tank by the pressure of the steam.

3. The process of lining the inner surfaces of a tank with hard rubber which comprises covering the inner surfaces of the tank with superimposed layers of soft rubber and hard rubber while both are in a plastic condition, applying steam under pressure to vulcanize said superimposed layers of hard rubber and said soft rubber together, said soft rubber being forced to adhere to the inner surfaces of the tank by the pressure of the steam, and applying water under pressure after vulcanization has taken place to keep the rubber lining adhering to the tank while the rubber lining and tank cool.

4. The process of lining the inner surfaces of a tank with hard rubber which comprises covering the inner surfaces of the tank with a layer of hard rubber veneered with a layer of soft rubber, both in a plastic condition, with the layer of soft rubber in contact with the inner surfaces of the tank, applying steam under pressure to vulcanize said hard rubber and said soft rubber together, said soft rubber being forced to adhere to the inner surfaces of the tank by the pressure of the steam.

5. The process of lining the inner surfaces of a tank with hard rubber which comprises covering the inner surfaces of the tank with a layer of hard rubber veneered with a layer of soft rubber, both in a plastic condition, with the layer of soft rubber in contact with the inner surfaces of the tank, applying steam under pressure to vulcanize said hard rubber and said soft rubber together, said soft rubber being forced to adhere to the inner surfaces of the tank by the pressure of the steam, and applying water under pressure after vulcanization has taken place to keep the rubber lining adhering to the tank while the rubber lining and tank cool.

6. The process of lining the inner surfaces of a tank with hard rubber which comprises covering the inner surfaces of the tank with a layer of hard rubber veneered with a layer of soft rubber, both in a plastic condition, with the layer of soft rubber in contact with the inner surfaces of the tank, closing the tank and applying steam under pressure to the interior of said tank to vulcanize said hard rubber and said soft rubber together, said soft rubber being forced to adhere to the inner surfaces of the tank by the pressure of the steam.

7. The process of lining the inner surfaces of a tank with hard rubber which comprises covering the inner surfaces of the tank with a layer of hard rubber veneered with a layer of soft rubber, both in a plastic condition, with the layer of soft rubber in contact with the inner surfaces of the tank, closing the tank, and applying steam under pressure to the interior of said tank to vulcanize said hard rubber and said soft rubber together, said soft rubber being forced to adhere to the inner surfaces of the tank by the pressure of the steam, and applying water under pressure to the interior of said tank after vulcanization has taken place while the pressure of the steam is on to keep the rubber lining adhering to the tank, turning off the steam, the pressure of the water being maintained until the rubber lining and tank cool.

In testimony whereof I have signed this specification in the presence of two subscribing witnesses.

EDWIN S. BOYER.

Witnesses:
F. G. ACHELIS,
A. V. BRISTOL.